Jan. 17, 1967   J. JEAN-MARIE JULES GERIN   3,298,707
AUTOMOBILE BODY ARRANGEMENT EFFECTING
THE BRAKING AND STEERING SYSTEMS
Filed Jan. 22, 1965   10 Sheets-Sheet 3
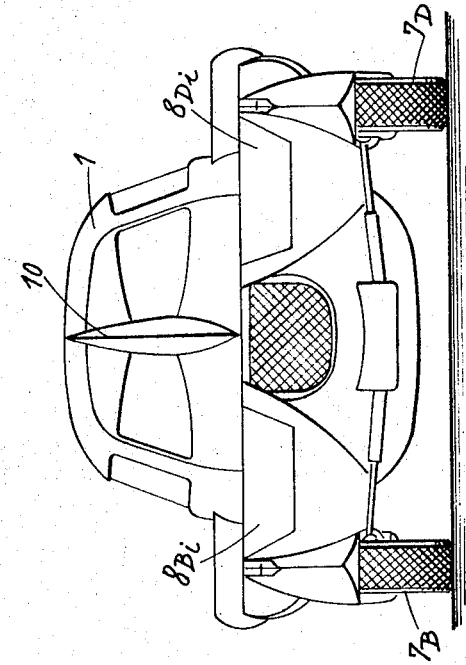
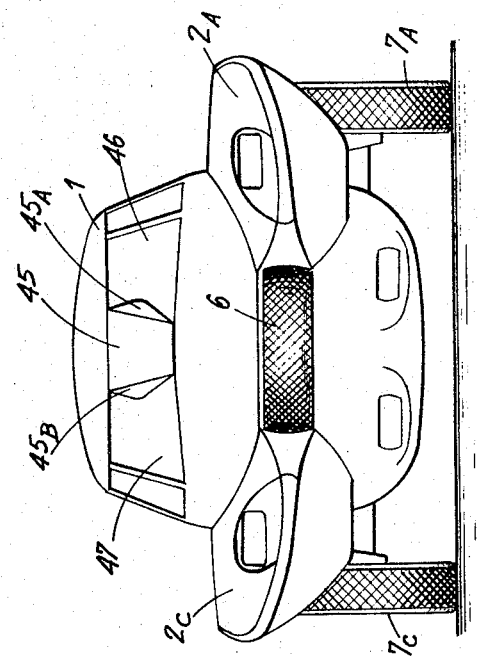
Inventor:
Jacques Jean-Marie Jules Gerin
By
Kim W. Flocks
Attorney

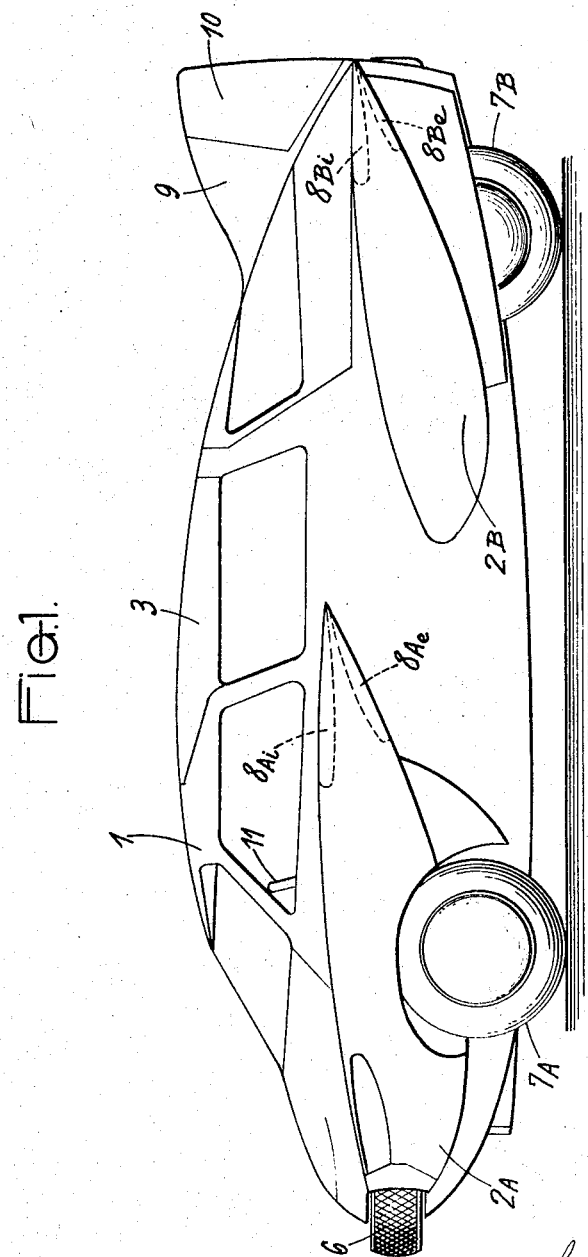

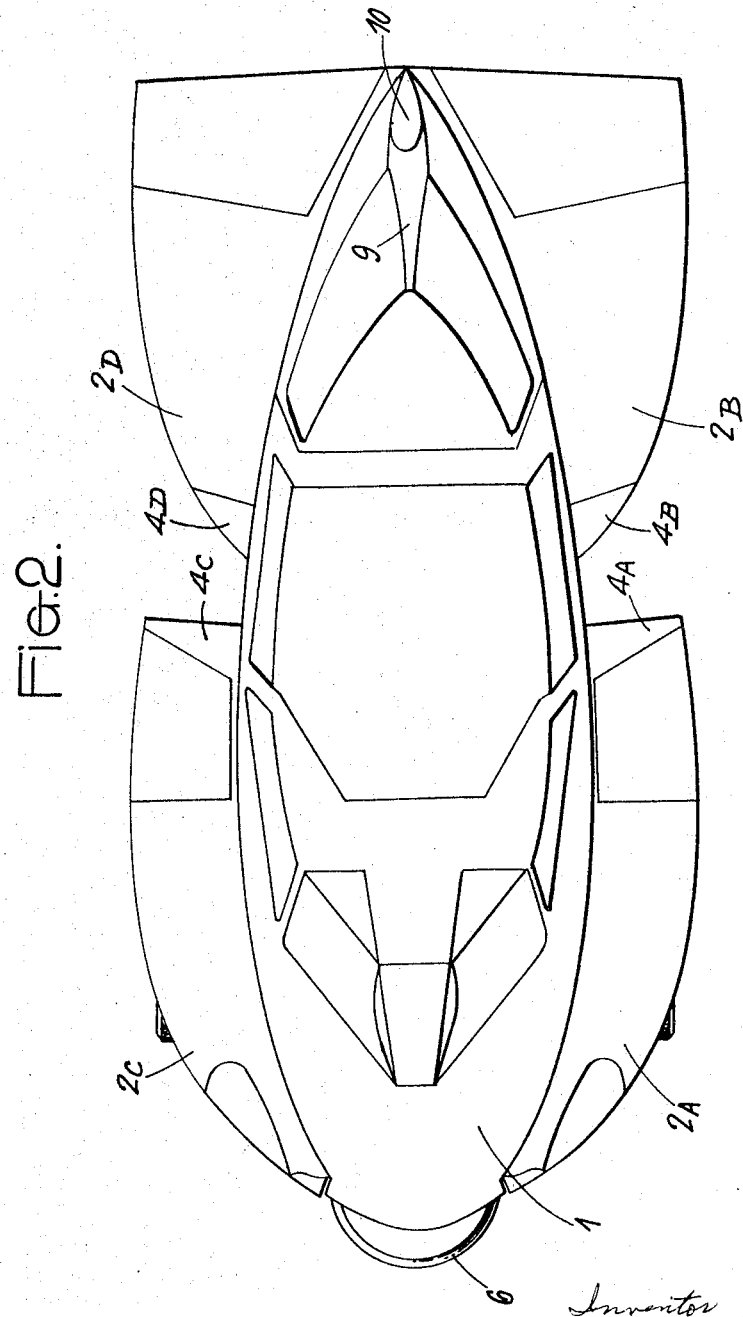

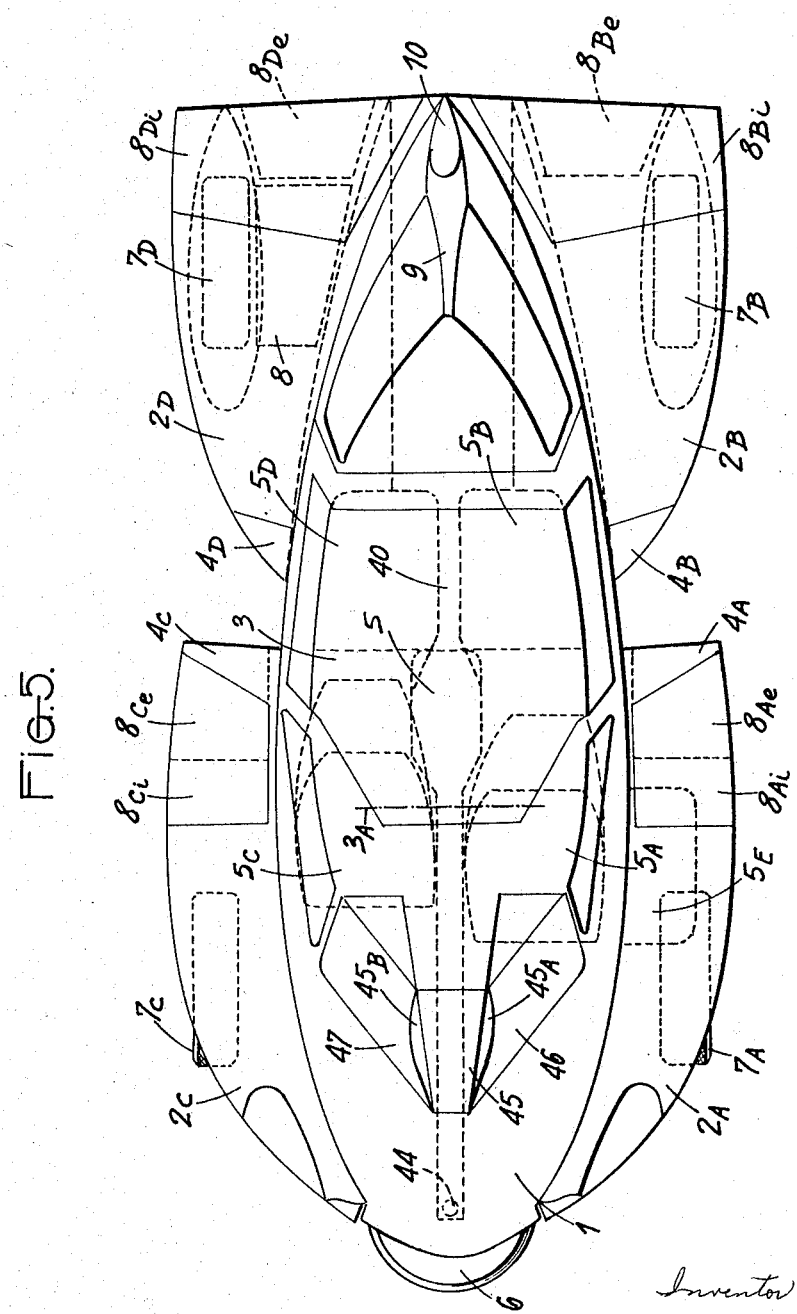

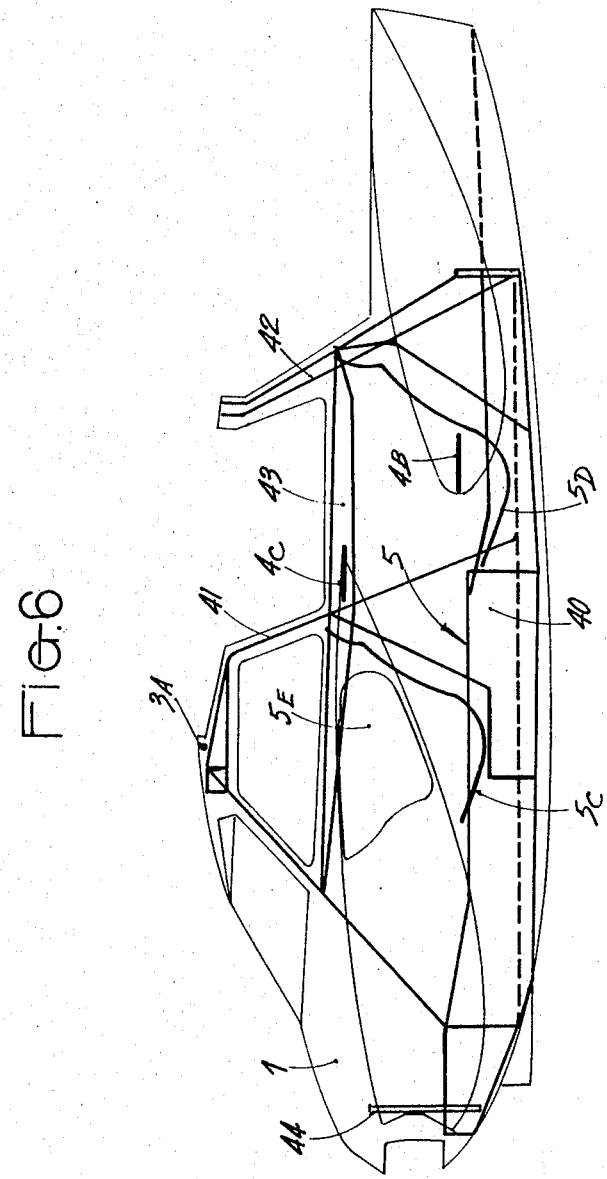

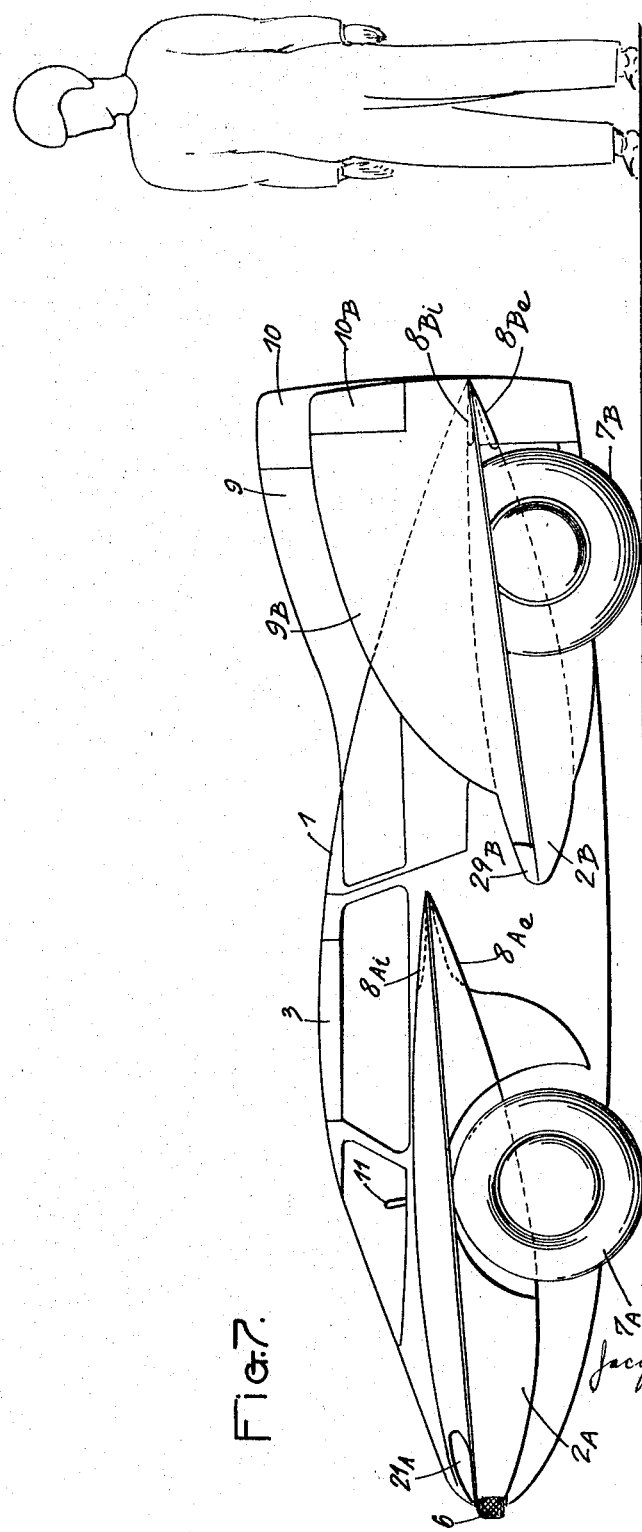
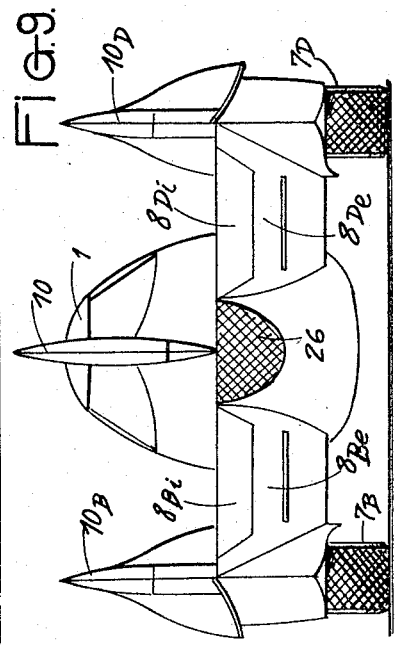
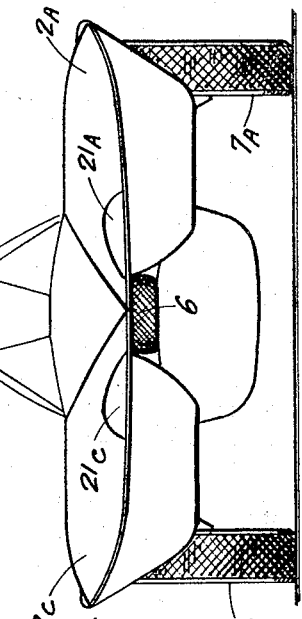

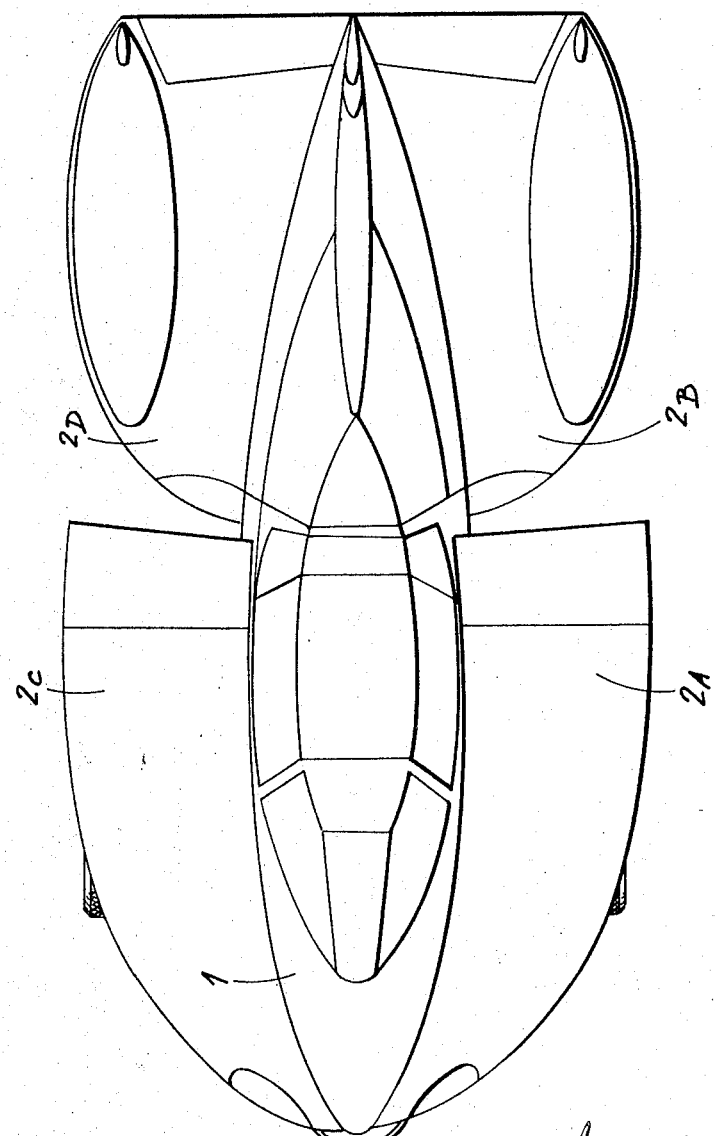

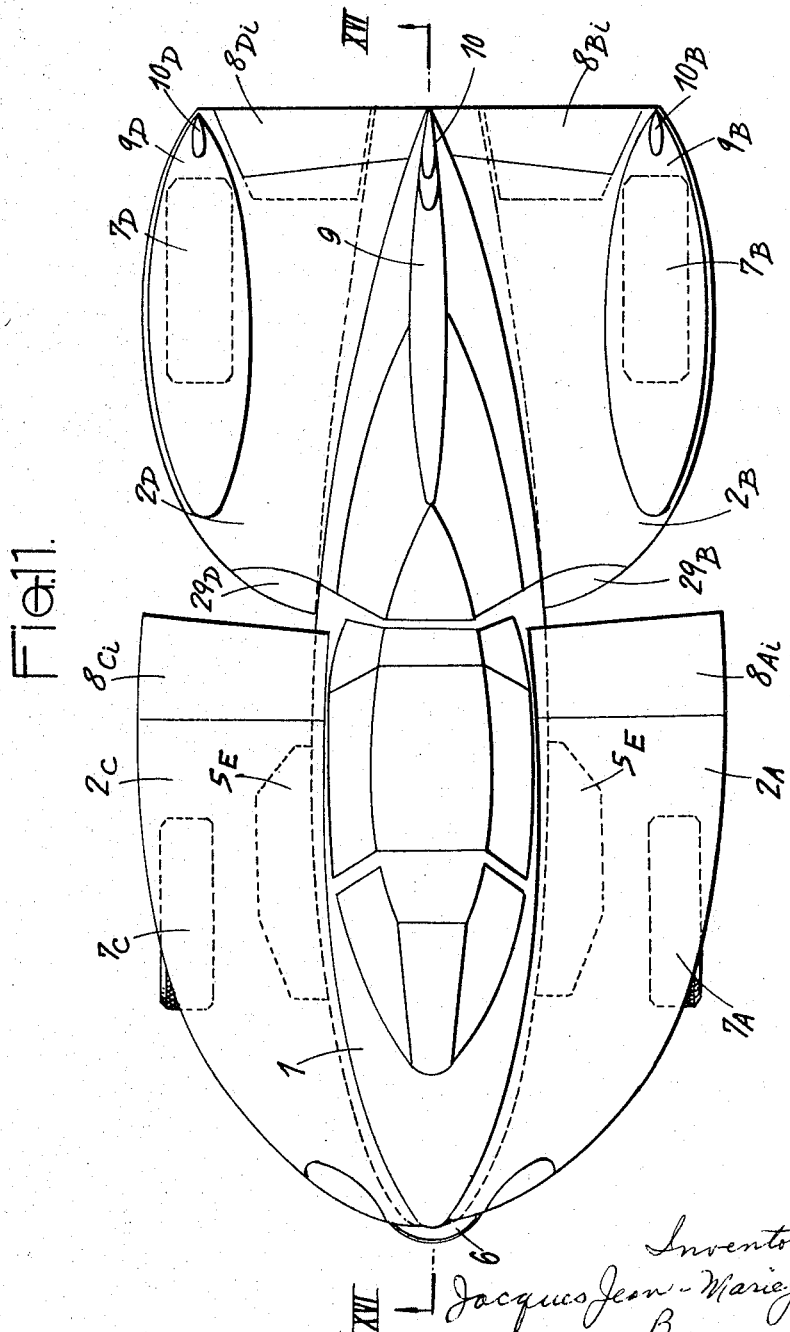

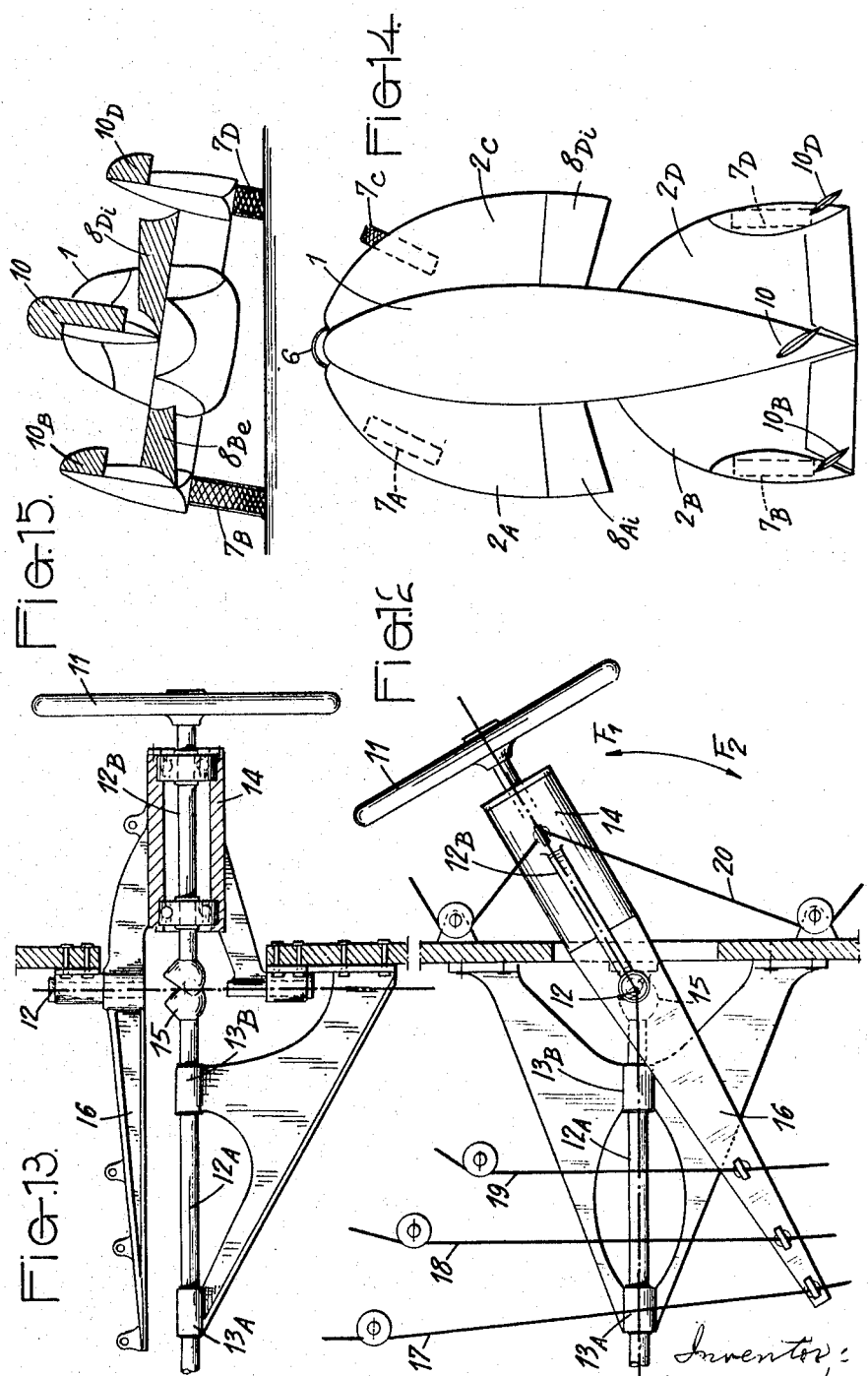

Jan. 17, 1967    J. JEAN-MARIE JULES GERIN    3,298,707
AUTOMOBILE BODY ARRANGEMENT EFFECTING
THE BRAKING AND STEERING SYSTEMS
Filed Jan. 22, 1965                                10 Sheets-Sheet 10

Inventor:
Jacques Jean-Marie Jules Gerin
By
Karl W. Flocks
Attorney

United States Patent Office 3,298,707
Patented Jan. 17, 1967

3,298,707
AUTOMOBILE BODY ARRANGEMENT EFFECTING THE BRAKING AND STEERING SYSTEMS
Jacques Jean-Marie Jules Gerin, 86 Ave. Victor Hugo, Dijon, France
Filed Jan. 22, 1965, Ser. No. 427,274
Claims priority, application France, Jan. 24, 1964, 961,548
4 Claims. (Cl. 280—87)

The body of automobile vehicles has been considered for many years as a simple means for protecting passengers against meteorological conditions in as comfortable a manner as possible.

Speed has recently become a primary object of motor vehicles and it was first thought sufficient to increase the power of the motors in order to achieve this purpose. However this method is insufficient and has soon revealed its drawbacks. It was then considered appropriate to apply to automobile bodies the rudiments of aerodynamic techniques.

The results achieved so far are far from being perfectly satisfactory due to the complexity of the problem to be solved.

The applicant has invented and perfected a motor vehicle body of completely new conception by means of which the desired results can be achieved and which results in a modern automobile vehicle having entirely novel features and advantages.

The vehicle according to the present invention is characterized by the fact that it comprises a central body of elongated shape the maximum transverse section of which is located in the forward portion thereof and the longitudinal section of which is spindle-shaped, the said central body being provided on either side with two wing portions arranged one behind the other and offset one with respect to the other, respectively at the front portion and the rear portion of the central body, these wing portions having a negative aerodynamic lift which balance at any moment the position lift of the central body.

According to other features of the invention, capable of being combined in various ways:

The general outward aspect of the central body and of the wing portions is that of a convex structure.

Both the wing portions are of very robust construction and transverse hoops are provided to insure protection of the upper portion of the central body, the structure thus obtained being particularly strong and resistant to accidental shocks.

Each wing member is provided on its trailing edge with an upper-flap and an under-flap.

The eight flaps can be actuated simultaneously, with a view to obtaining an aerodynamic braking effect, by means of a special control.

The simultaneous control of the flaps is preferably combined with that of the conventional brake pedal.

The four under-flaps and the four upper-flaps may be differentially actuated with a view to obtaining an "unsymmetrical" aerodynamic action which promotes good stability of the vehicle by opposing the action of centrifugal force when negotiating curves at high speed.

According to a particularly advantageous form of embodiment of the invention for racing cars or for very high-speed vehicles, the aerodynamic action due to the differential control of the flaps is combined with a car suspension of the type in which the four wheels move constantly in one and the same plane and in which the chassis can become highly inclined in relation to the horizontal.

The vehicle is provided at its rear portion with at least one vertical tail unit provided with a movable control surface the control of which is preferably combined with the differential control of the under- and upper-flaps on the wing members.

When the invention is applied to a racing car or to very high-speed vehicles, the central body is preferably provided with a central tail-unit and with two lateral tail units disposed in such a manner that two guided airstreams are produced which limit as far as possible undesirable inter-actions with other vehicles in case the differential control of the flaps is made use of or in case a simultaneous use of all the flaps is resorted to so as to obtain an aerodynamical braking effect.

According to an advantageous form of embodiment, the steering wheel is so arranged that it can not only direct the front wheels in the usual way but also act differentially on the flaps when it is rocked to the right or to the left in relation to a substantially vertical pivoting axis.

An additional brake control acting on the rear wheels only is provided with advantage, said control being combined with the rocking of the steering wheel in such a manner that alone the brake located on the inner side of a bend of the road comes into operation when acting on the additional brake control.

The movable control surface of the vertical tail-units are associated with the rocking of the steering wheel through the medium of a control system which only operates at a high speed sufficient to render utilizable the aerodynamic effect.

The head-lights which may be used are so mounted that each can rotate about a vertical axis and they are associated with the rocking movement of the steering wheel in such a manner that alone the head-light situated on the inner side of a bend in the road or track becomes oriented automatically towards the inside of said bend.

Other features, advantages and characteristics of the present invention will become apparent from a reading of the following description with reference to the accompanying drawings showing diagrammatically and without any intention to limit the invention, several possible forms of embodiment thereof.

In said drawings:

FIGURES 1, 2, 3 and 4 are views showing respectively in side elevation, in plan, in front elevation and in rear elevation, a four-seat touring-car in accordance with the invention.

FIGURE 5 is a plan view similar to that of FIGURE 2 but the constituent elements which are not visible in FIGURE 2 are here shown in dotted lines.

FIGURE 6 is a detail view showing the inner structure of the vehicle conferring to it great rigidity and strength.

FIGURES 7, 8, 9 and 10 are respectively a side elevation, plan, front elevation and rear elevation of a single-seat racing car, in accordance with the invention.

FIGURE 11 is a plan view similar to FIGURE 8 but the constituent elements not shown in FIG. 8 are shown here in dotted lines.

FIGURES 12 and 13 are detail views on a larger scale showing respectively in plan and in elevation the principle of the improved steering control of the racing car.

FIGURES 14 and 15 are detail diagrams on a smaller scale showing how the vehicle is steered.

Figure 16:
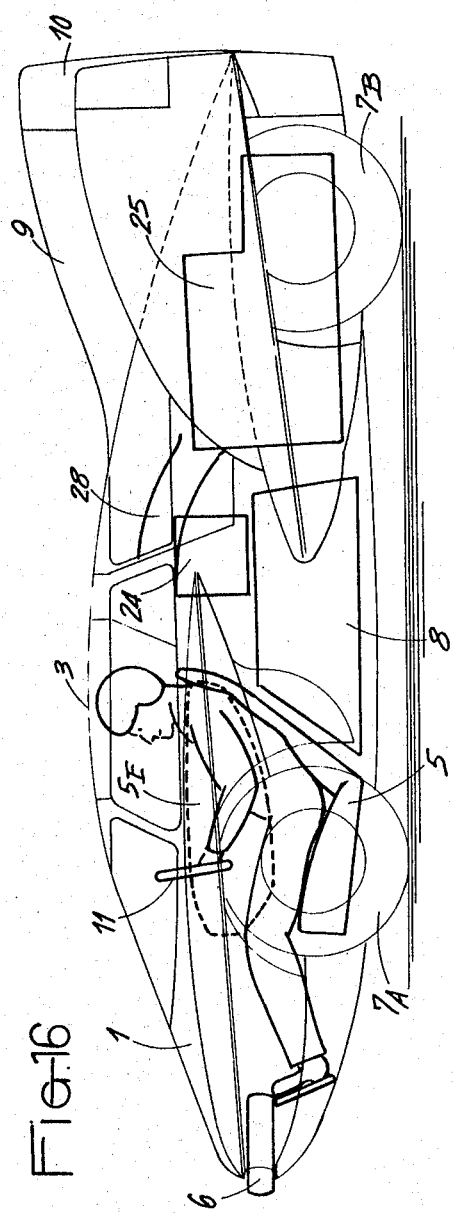
FIGURE 16 is a vertical longitudinal section of the racing car, along the line XVI—XVI of FIG. 11.

The automobile vehicle shown by way of example in FIGURES 1 to 6 is a four-seat Berlin. This car is essentially characterized in that it comprises a central body 1 in the form of an elongated spindle-shaped structure the maximum cross-section of which is located within the front third thereof and the longitudinal axial section of which has the shape of a thick wing, said central body 1 being provided, on each of its side faces, with two wing portions $2_A$, $2_B$ and $2_C$, $2_D$ which are respectively disposed tandem-wise and are offset the one with respect to the other on each of the said side faces of the central body, as is clearly seen from FIGURES 1 and 2.

According to an important feature of the invention, whose advantages shall be brought out as the description proceeds, it is to be observed that the central body and the four wing portions constitute a structure of generally convex shape without any re-entrant portion.

According to a further essential feature of the invention, the wing portions $2_A$, $2_B$ and $2_C$, $2_D$ have a negative incidence angle in relation to the direction of movement of the vehicle (so as to provide a negative lift), which is at every moment balanced by the positive left of the central body 1. In other words, the central body 1 which, by reason of its very shape, has an increasing lift as the vehicle speed increases and consequently has a tendency to minimize the load it exerts on the wheels, has its action compensated at each moment by that of the wing portions whose negative lift also becomes higher as the speed of the vehicle increases.

Moreover, both wing portions located on the same side of the central body are tandem-mounted and are offset in relation to one another, as can be clearly seen in FIGURE 1, so that their compensating action shall be uniformly exerted on the central body 1, and also to permit easy access of the passengers to the vehicle body.

According to an advantageous but noncompulsory form of embodiment, the cockpit or passenger cabin is provided at its top portion with a part 3 forming a folding roof which pivots about a transverse axis $3_A$ so as to allow the passengers to enter the vehicle, which owing to its very conception is very low, by making use of outer footboards $4_B$, $4_D$ provided on the leading edge of the rear wing portions $2_B$, $2_D$ and $4_A$, $4_C$ provided on the trailing edge of the front wing portions $2_A$, $2_C$, and also of an inner footboard 5 provided within the cockpit or cabin between the four seats $5_A$, $5_B$, $5_C$, $5_D$ (FIG. 5).

It is possible to easily accommodate four persons since the part of the body having the largest transverse section is situated very appreciably forward of the car in relation to that of conventional cars, the motor being, of course, located rearward of the central body. The passenger cabin is very strongly protected on its side and front portions by the wing portions $2_A$ and $2_C$ which have the feature of having a maximum moment of inertia and of resistance in a substantially horizontal plane, that is in the plane where accidental shocks between vehicles or with other stationary or movable obstacles are likely to occur. It is obvious that the internal structure of the wing portions is so designed as to present high rigidity and at the same time marked lightness in weight. To this end, the structure described in the U.S. Patent No. 3,098,675 in the name of the applicant, can be adopted with advantage.

It should be observed that the vehicle is so designed as to possess great rigidity and a high strength in all directions. To this end, the central body 1 is mounted on an internal structure essentially comprising, as seen in FIGURE 6, a longitudinal central beam 40 and two transverse hoops designated by the general references 41 and 42, which confer rigidity to the upper portion of the central body 1 and give effective protection in case of accidental sideways somersaulting.

In view of the fact that a folding roof 3 is provided, pivoting about the transverse axis $3_A$, the portion of the body enveloping the passenger cabin is supported and re-inforced at the level of the passengers by two longitudinal lateral beams, such as beam 43 seen in FIGURE 6.

Finally, additional protection is conferred, at the front, by a protector 6 which can advantageously be the spare wheel of the vehicle, freely mounted on a shaft 44 rigidly secured at the front part of the passenger cabin on the central beam 40, for example, as described in the U.S. Patent No. 3,074,751 in the name of the applicant.

With the combination of the above features, the vehicle has a large spacing between wheels and a reduced wheel base and is consequently easy to handle and has good road-holding characteristics.

The wheels $7_A$, $7_B$, $7_C$, and $7_D$ are protected by the wing portions $2_A$, $2_B$, $2_C$ and $2_D$ which eliminate the turbulence losses occurring in conventional vehicles. These wheels can therefore be spaced apart to the maximum possible extent.

The safety of the passengers is further increased by the fact that the fuel tank 8 can be located outside the passenger cabin, for example it can be placed in the rear right-hand wing $2_D$.

According to a further feature of the present invention, each wing portion is provided on its trailing edge with an upper flap and a lower flap. In the various figures, the four upper flaps have been designated respectively by the references $8_{Ai}$, $8_{Bi}$, $8_{Ci}$ and $8_{Di}$ whereas the four lower flaps have been designated respectively by the references $8_{Ae}$, $8_{Be}$, $8_{Ce}$ and $8_{De}$.

In is interesting to observe that due to the presence of the left wing portion $2_A$, it is possible to provide a cavity $5_E$ in which the driver can place his left arm so as to enable him to drive more easily. Moreover, the rear portion of the central body 1 is provided, in the longitudinal plane of symmetry thereof, with vertical tail unit 9 on the rear portion of which is pivotally mounted a movable flap 10 constituting a control surface the use of which will be explained later.

According to an important feature of the invention, the eight flaps (both the upper and lower flaps) can be actuated simultaneously with a view to obtaining an aerodynamic braking effect, when the speed of the vehicle is sufficiently high.

Obviously, the flaps can be actuated by any suitable mechanical, electro-mechanical, hydraulic or pneumatic means in view of the easy possibility of disposing of power. By reason of the particularly favourable coefficient of penetration of the vehicle, a very high speed can be obtained with a low power motor. It is therefore possible to obtain the necessary power for the control of auxiliary devices whilst maintaining global power demand distinctly below what is usually required.

The simultaneous control of the flaps is achieved by means of a special handle which the driver can operate at the desired moment. When this handle is placed in a given position, the simultaneous control of the flaps is automatically associated with that of the pedal controlling the normal brakes. In accordance with an advantageous form of embodiment an additional brake pedal can be provided which actuates only the rear brakes of the vehicle, said pedal having no action on the flaps.

According to another feature of the invention, more particularly applicable to very high speed vehicles or racing cars, concerning which further details will be given later, the four upper flaps and the four lower flaps can be actuated differentially with a view to obtaining an unsymmetrical aerodynamical action which promotes good stability of the vehicle by opposing the action of centrifugal force when negotiating curves at high speed.

This differential action of the flaps is re-inforced by the simultaneous actuation in the required direction of the rear vertical control surface 10.

As in connection with the simultaneous control of the flaps, the differential control thereof is obtained by means of a special handle actuated by the driver at the required moment. It will be seen later how this differential control can be automatically associated with the steering control, this being particularly advantageous and effective in racing cars.

According to a further feature of the invention clearly shown in FIGURES 2, 3 and 5, the front windshield comprises a central portion 45 and two symmetrical side portions 46 and 47, it being observed that the central portion 45 is narrower at its lower end than at its upper end and comprises two side lips $45_A$, $45_B$ acting as deflectors for preventing mud, rain or snow from forming a deposit on the side portions or faces 46 and 47. On the other hand, this specific form of windshield confers to the passenger cabin or cockpit the best possible penetration into the air as it enables the maximum transverse section thereof to be located within the front third of its length and to confer to its front portion a regular rounded surface, as is desirable in order to obtain the best aerodynamic properties.

The single seat racing car shown by way of example in FIGURES 7, 8, 9, 10 and 11 is of a design generally similar to that of the touring car shown in FIGURES 1 to 6 which has just been described.

In order not to unnecessarily burden the present specification, the features that are common to both types of vehicle shall therefore not be described afresh. The identical elements shall simply be designated in FIGURES 7 to 11 by the same reference numerals.

The differential control of the flaps being effective only when driving above a certain speed limit, the applicant has especially studied this question in connection with a racing car. As the present specification is directed to a light-weight vehicle for the young and to racing cars, it enables all types of intermediary cars to be envisaged.

According to a particularly advantageous feature, when dealing with a racing car, the aerodynamic action due to the differential control of the flaps is combined with a suspension of the vehicle of the type wherein the wheels move constantly in one and the same plane and in which the chassis can become highly inclined in relation to the horizontal. To this end, use may be made, although this is not compulsory, of a suspension of the type described in applicant's U.S. Patent Application No. 400,391 filed on September 30, 1964.

According to another feature suitable for racing cars and which can be combined with the preceding feature, in addition to the central vertical tail-unit 9 having a movable control surface 10, there are two side tail-units $9_B$, $9_D$, provided with respective control surfaces $10_B$, $10_D$. These three tail-units define two guided air streams which restrict to a minimum the troublesome interactions with other vehicles either when making use of the differential control of the flaps or when making use of the simultaneous control of the flaps for aerodynamic braking purposes. Moreover the vertical tail-units constitute walls which limit the drawbacks resulting from the very small width of the wing portions.

According to an advantageous form of embodiment, the differential control of the flaps is obtained as shown for example in FIGURES 12, 13, 14 and 15. The principle of such control is as follows: the steering wheel 11 is so arranged that not only does it act on the orientation of the front wheels when it is turned in the usual manner, but it actuates differentially the flaps when it is rocked towards the right or the left in relation to a substantially vertical shaft 12.

To this end, the steering pillar comprises: (a) a fixed portion $12_A$ connected to the steering box (not shown in the drawing), said portion being rotatably mounted in two bearings $13_A$, $13_B$; (b) a movable portion $12_B$ on which is keyed the steering wheel 11, this portion being rotatably mounted in a movable bearing 14, in its turn pivotally mounted on the substantially vertical shaft 12. Both portions $12_A$, $12_B$ of the steering pillar are connected to one another through the medium of a universal joint 15, preferably homokinetic, the geometrical centre of which obviously lies on the pivoting axis 12.

The movable bearing 14 comprises a forward arm 16 which is in alignment with the movable portion $12_B$ and moves therewith.

As can at once be seen, it is simply necessary to provide a connection between the rocking arm 16 and the respective control devices of the upper and lower flaps and of the control surfaces in order to obtain a differential action and therefore an aerodynamic steering system.

For the sake of clarity of the description, it has been assumed, without this being compulsory, that the action of the steering system on the controls of the aforesaid devices is a mechanical one.

To this end, FIGURES 9 and 10 show four control cables 17, 18, 19 and 20 secured in their centre to the pivoting arm 16.

The cable 17 is connected to the devices for actuating the control surfaces in such a manner that when the driver rocks the steering wheel 11 in the direction of the arrow $F_1$, (a) the upper flaps $8_{Di}$ and $8_{Ci}$ located on the right-hand side of the vehicle are opened; (b) the lower flaps $8_{Be}$ and $8_{Ae}$ located on the left-hand side of the vehicle are opened; (c) the three rear control surfaces 10, $10_B$ and $10_D$ are pivoted towards the right, it being understood that the pivoting angle of the flaps and control surfaces are the greater as the driver pushes the steering wheel 11 further in the direction of the arrow $F_1$.

It is to be understood, moreover, that if the driver rocks the steering wheel 11 in the direction $F_2$ the cable 17 actuates the flaps and control surfaces in the opposite manner.

Moreover, the driver can act in the usual manner on the direction of the front wheels $7_A$ and $7_C$, by means of the Cardan 15, whatever be the position of the steering wheel 11 in relation to the mid-position of symmetry.

It has been stated above that, with a view to increasing the efficiency of the aerodynamical control system, it is desirable to combine it with a special suspension of the type in which the four wheels move in one and the same plane and in which the chassis can become highly inclined in relation to the horizontal under the action of a special control system which is described in applicant's aforementioned U.S. patent application No. 400,391.

The cable 18 is connected to such a suspension device in such a manner that when the driver pushes the steering wheel 11 in the direction of the arrow $F_1$, this causes the chassis to be raised on the left side of the vehicle and to be lowered on the right-hand side of the vehicle.

It will become apparent from the foregoing and in particular from FIGURES 11 and 12 that the action of the centrifugal force is compensated to a maximum since the vehicle is inclined towards the inside of the road bend, and that the wheels on the inside of the bend are overloaded whereas the wheels on the outside of the bend are underloaded.

It will be seen that any skidding of the vehicles is practically eliminated and consequently the wear of the tyres is reduced when taking road bends at high speed.

The cable 19 is mounted in such a manner that it controls the pivoting of the head-light located on the inside of the road bend, the position of the other head-light remaining unaltered. This arrangement is especially advantageous and efficient in connection with very high speed cars participating in races which are run, at least in part, during the night.

The cable 20 is so mounted that when the driver pushes the steering wheel 11 in the direction of the arrow $F_1$ the result is the operation of the right-hand rear brake alone and vice versa.

Figure 17:
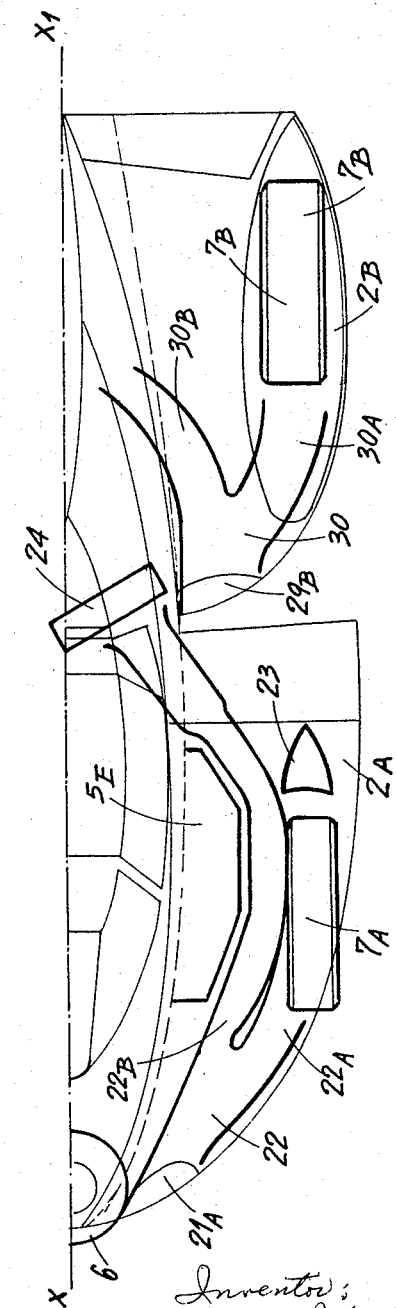
FIGURE 17 is a half-view, in plan and section, of the same racing car.

Due to the specific design of the racing car just described, the air supply to the various elements which must be cooled is effected in a very rational manner, as will be seen when describing FIGURES 16 and 17.

In the front part of the vehicle are disposed two symmetrical air intakes $21_A$ and $21_C$. As the vehicle is symmetrical in relation to the longitudinal axis $XX_1$, only the left-hand side of the vehicle has been shown in FIG- URE 17 and described in what follows, the right-hand portion being identical. On the intake 21$_A$ is branched an air pipe 22 which splits into two portions, namely, (1) a portion 22$_A$ which leads air to the cooling arrangement of the braking system of the left-hand front wheel 7$_A$ and of the wheel itself, a streamlined part 23 enabling the air to come out of the cooling system without producing eddy currents; (2) a portion 22$_B$ conveying air to cool the half-radiator 24 placed forward of the motor 25, the latter being mounted in front of the axis of the rear wheels, the escape of the air being effected through the discharge grid (see FIGURE 10).

The driver's cockpit comprises two side air intakes. On the intake 27$_A$ is branched an air duct 28 which conveys feed air to the left-hand battery of carburettors.

Finally, on the leading edge of the rear wing portions 2$_B$ and 2$_D$ there are two intakes 29$_B$ and 29$_D$ (see FIG. 11). On the intake is branched an air duct 30 which splits up into a duct 30$_A$ which conducts air to the left-hand wheel 7$_B$ to cool it, and a further duct 30$_B$ conducting cooling air to the braking system of the wheel 7$_B$, mounted against the rear axle box.

It is obvious that the cooling system just described can be completed or modified in accordance with the requirements of the vehicle.

The invention has only been described and illustrated in a purely explanatory manner and without any intention of limiting sense; modifications of detail can be made within the spirit of the invention without falling outside its scope.

The above description of the various forms of embodiment of the invention has brought out features and advantages of the invention and these can be summarized as follows:

(1) It appears obvious that owing to its half-terrestrial half-aerial aspect, the vehicle according to the invention is attractive, and is likely to appeal more particularly to the young.

(2) By reason of its perfect air penetration it is possible to provide a high speed car with a motor of fairly moderate power.

(3) Due to its particular shape and to the absence of any re-entrant portion, use can be made for its construction of the specially economical method described in French Patent No. 1,159,558 of November 16, 1954 and in its first patent of addition No. 75,006 of November 29, 1954, both in the name of the applicant;

(4) The vehicle according to the invention is absolutely safe in the following respects:

(a) Safety due to its form resulting in an exceptional aerodynamical stability and road behaviour which have never yet been attained;

(b) Safety due to its construction procuring efficient protection resulting from the presence of the spare wheel located in front, from the wing portions and the transverse hoops which give protection against the consequences of accidental shocks or of the car leaving the road.

(c) Safety from fire hazards owing to the fuel tank being located outside the passenger cabin or cockpit;

(5) The vehicle according to the invention is light in weight and at the same time well stabilized on the road at high speed thanks to the combination of the main body which has a positive left and to the wing portions which have a negative lift.

(6) Skidding is eliminated and wear of the tires is practically negligible when negotiating a curve at high speed, as a result of the special steering system which enables the driver to make use, at high speed, of the aerodynamic action of the flaps and of the adjustable suspension to counteract the action of the centrifugal force.

(7) It is possible, when braking at high speed either to aerodynamically overload the rear axle alone to increase road adhesion by actuating the upper flaps of the rear wing portions, or to aerodynamically unload the front axle to make it lighter on the road by actuating the lower flaps of the front wing portions.

I claim:
1. Automobile vehicle comprising in combination:
an elongated central body the maximum transverse section of which is located in the forward portion thereof and the longitudinal section of which is in the form of a thick wing having a positive lift in the forward direction of movement of the vehicle,
four wing portions having a negative lift in the forward direction of movement of the vehicle, arranged symmetrically two by two, tandem-wise, on the side faces of the said central body,
four upper flaps and four lower flaps arranged two by two on each side of the trailing edges of the said wing portion,
a braking system for the vehicle wheels,
a system for guiding the steering wheels of the vehicle,
control means for simultaneously opening the said upper and lower flaps, said means being actuated by the said wheel braking system,
means for differentially opening the said upper and lower flaps, the said means being actuated by the said system for guiding the vehicle steering wheels,
at least one vertical tail-unit situated at the rear of the vehicle and provided with a control surface actuated by the upper and lower flap differential control means,
and control means adapted to incline the vehicle sideways in relation to the horizontal, said means being actuated by the said upper and lower flap differential control means.

2. Automobile vehicle comprising in combination:
a central body of elongated shape the maximum transverse section of which is situated in the front portion thereof and having a longitudinal section in the form of a thick wing with a positive lift characteristic in the forward direction of movement of the vehicle,
four wing portions having a negative lift characteristic in the forward direction of movement of the vehicle, arranged symmetrically two by two tandem-wise on the side faces of the said central body,
each set of two wing portions comprising one wing portion disposed forwardly of the central body and one disposed at the rear portion of the central body, said rearwardly disposed wing portion being offset in vertical relation to said forwardly disposed wing portion,
the negative aerodynamic lift characteristics of said wing portions balancing at any moment the positive lift characteristics of said central body;
the central body and the wing portions exhibiting as a whole, solely convex outer surfaces without any re-entrant portions.

3. Automobile vehicle comprising in combination:
a convex central body in the form of a thick wing having a positive lift in the forward direction of movement of the vehicle,
four convex wing portions having a negative lift in the forward direction of movement of the vehicle, arranged symmetrically two by two, tandem-wise, on the side faces of the said central body,
four upper flaps and four lower flaps arranged two-by-two on each trailing edge of the said wing portions,
braking means for the wheels of the vehicle,
a system for guiding the vehicle steering wheels,
control means for simultaneously opening the said upper and lower flaps, said means being connected with the control of the said braking means,
means for differentially controlling the opening of the said upper and lower flaps, said means being connected with the system for guiding the vehicle steering wheels,
and a vertical tail unit provided on the rear portion of the vehicle with a movable control surface actuated by the said differential control means for the upper and lower flaps.

4. Automobile vehicle comprising in combination:
a convex central body in the form of a thick wing having a positive lift in the forward direction of movement of the vehicle,
four convex wing portions having a negative lift in the forward direction of movement of the vehicle, arranged symmetrically two by two, tandem-wise, on the side faces of the said central body,
four upper flaps and four lower flaps arranged two-by-two on each trailing edge of the said wing portions,
braking means for the wheels of the vehicle,
a system for guiding the vehicle steering wheels,
control means for simultaneously opening the said upper and lower flaps, said means being connected with the control of the said braking means,
means for differentially controlling the opening of the said upper and lower flaps, said means being connected with the system for guiding the vehicle steering wheels,
and means for highly inclining the vehicle sideways in relation to the horizontal, said means being controlled by the said system for guiding the vehicle steering wheels.

References Cited by the Examiner

UNITED STATES PATENTS

| 2,128,686 | 12/1938 | Andreau | 296—1 |
| 2,149,161 | 2/1939 | Byrnes | 188—87 |
| 2,417,725 | 3/1947 | Zuck | 244—50 |
| 2,665,137 | 1/1954 | Kamm | 296—1 |
| 2,797,951 | 7/1957 | McLean et al. | 296—1 |

FOREIGN PATENTS

| 499,199 | 6/1930 | Germany. |
| 709,303 | 8/1941 | Germany. |

KENNETH H. BETTS, *Primary Examiner.*